US012235112B1

(12) United States Patent
Arnicar et al.

(10) Patent No.: US 12,235,112 B1
(45) Date of Patent: Feb. 25, 2025

(54) MONITORING MAP DATA FOR VALIDATION OF VEHICLE SYSTEMS

(71) Applicant: Zoox, Inc., Foster City, CA (US)

(72) Inventors: Taylor Andrew Arnicar, Sunnyvale, CA (US); Christopher James Gibson, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 7 days.

(21) Appl. No.: 17/491,009

(22) Filed: Sep. 30, 2021

(51) Int. Cl.
*G01C 21/32* (2006.01)
*G01C 21/00* (2006.01)

(52) U.S. Cl.
CPC ......... *G01C 21/32* (2013.01); *G01C 21/3815* (2020.08); *G01C 21/3844* (2020.08); *G01C 21/387* (2020.08)

(58) Field of Classification Search
None
See application file for complete search history.

(56) References Cited

U.S. PATENT DOCUMENTS

| | | | |
|---|---|---|---|
| 2019/0271559 A1* | 9/2019 | Colgate | G06V 30/274 |
| 2020/0133296 A1* | 4/2020 | Pauls | G01S 17/86 |
| 2020/0370920 A1* | 11/2020 | Ahmed | G01S 13/89 |
| 2021/0078594 A1* | 3/2021 | Bansal | G01C 21/3407 |
| 2021/0156711 A1* | 5/2021 | Flade | G01C 25/00 |
| 2021/0304491 A1* | 9/2021 | Caccin | G06T 7/55 |
| 2021/0358296 A1* | 11/2021 | Lee | G06T 7/246 |

FOREIGN PATENT DOCUMENTS

WO WO-2014189059 A1 * 11/2014 .......... B60W 40/064

* cited by examiner

*Primary Examiner* — Tuan C To
*Assistant Examiner* — David Ruben Pedersen
(74) *Attorney, Agent, or Firm* — Lee & Hayes, P.C.

(57) ABSTRACT

Techniques for validating operation of vehicle systems using map data are described herein. The techniques may include receiving sensor data associated with an environment in which a vehicle is operating and generating estimated map data based at least in part on the sensor data. Additionally, stored map data may be received and compared with the estimated map data. If it is determined that an inconsistency exists between the estimated map data and the stored map data, the techniques may include determining whether the inconsistency is attributable to an error associated with the stored map data, the sensor data, or a localization system of the vehicle. As such, one or more specific remedial actions may then be performed based at least in part on determining that the error is associated with at least one of the stored map data, the sensor data, or the localization system.

19 Claims, 6 Drawing Sheets

MONITORING MAP DATA FOR VALIDATION OF VEHICLE SYSTEMS

BACKGROUND

Autonomous vehicles utilize various systems, methods, and apparatuses to traverse an environment. For instance, autonomous vehicles utilize route planning methods, apparatuses, and systems to navigate through congested areas where other vehicles, people, buildings, and other objects may be present. In some examples, an autonomous vehicle may make decisions while traversing an environment to ensure safety for passengers, as well as other objects in the environment. Autonomous vehicles can also include sensors to collect information about objects in the surrounding environment, and this information can be used to make decisions about how to traverse the environment. Furthermore, autonomous vehicles can utilize maps of the surrounding environment for making decisions on how to traverse the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
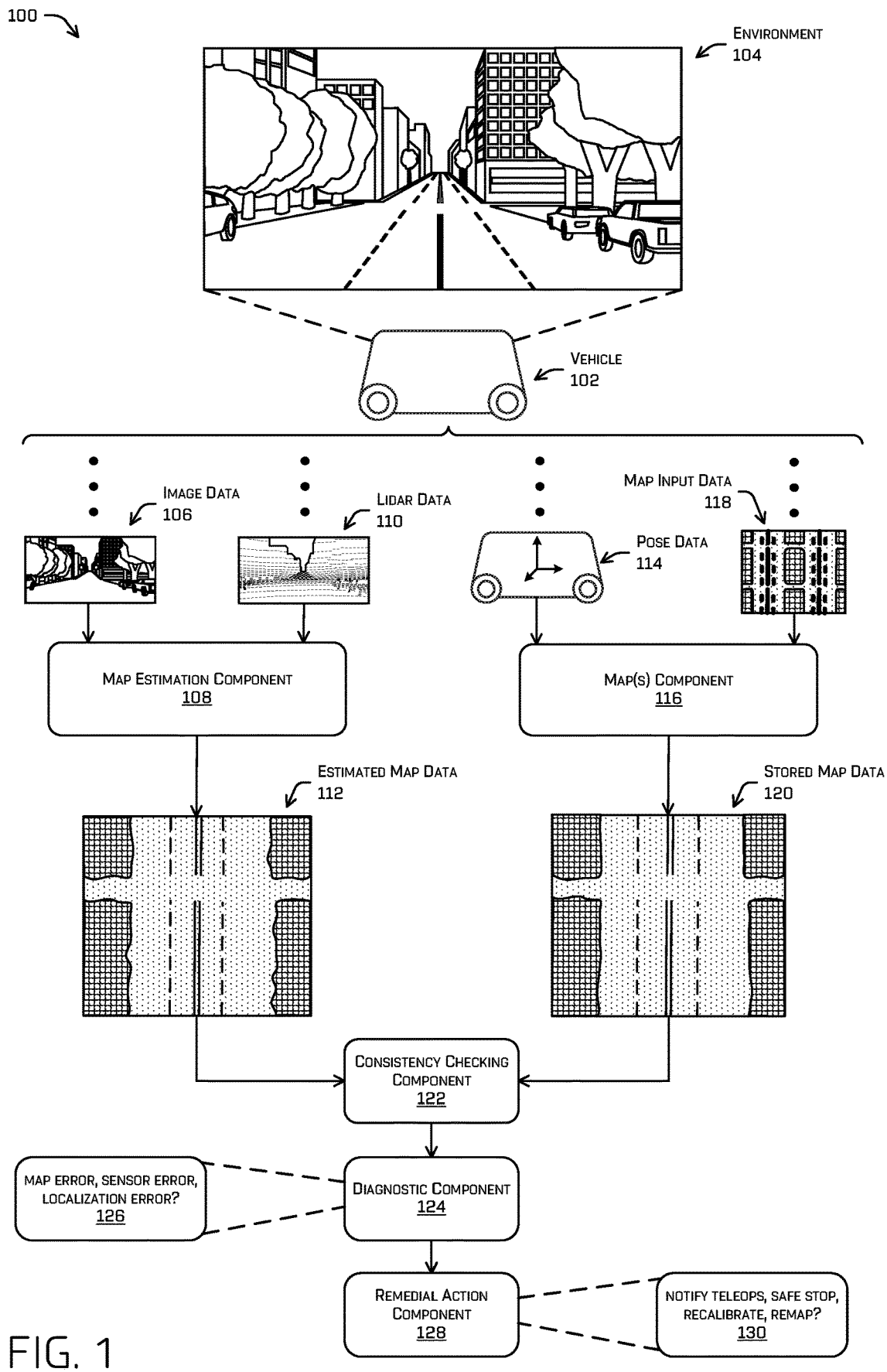
FIG. 1 is a pictorial flow diagram illustrating an example process in which sensor data may be used to verify consistency between map data stored by a vehicle and an environment in which the vehicle is operating, as well as to validate operation of one or more systems or components of the vehicle.

Techniques for validating operation of vehicle systems using map data are described herein. In some cases, stored map data may be used by a vehicle, such as an autonomous vehicle, to traverse an environment. However, vehicles can also rely on additional data, such as sensor data, a vehicle pose, a planned trajectory, and the like when traversing the environment. Accordingly, this disclosure is directed to, among other things, verifying reliability of any such data in various ways, as well as verifying proper operation of vehicle systems and/or components associated with that data.

For example, the vehicle may utilize sensor data representing an environment in which the vehicle is operating to generate an estimated map of the environment. The vehicle may compare the estimated map with a stored map to determine whether the sensor data and/or the stored map data is reliable. If the vehicle detects an inconsistency between the estimated map and the stored map, the vehicle may perform one or more diagnostic operations to determine whether the inconsistency is attributable to an error associated with one or more of the vehicle's systems, such as a map system, a sensor system, a localization system, and the like. For instance, if the estimated map and the stored map can be realigned (e.g., translated, rotated, shifted, etc. relative to one another) to remedy the inconsistency (e.g., such that a consistency between the estimated map and the stored map is greater than a threshold consistency), then the error may be associated with the localization system. As another example, if first associated portions of the estimated map and the stored map do not indicate an inconsistency (e.g., a majority of map features are aligned), but second associated portions of the estimated map and the stored map include an inconsistency (e.g., some of the map features are not aligned) that cannot be realigned, then the error may be associated with the stored map. As yet another example, if a majority of the map features are not aligned and cannot be aligned, then the error may be associated with the sensor data or the sensor system. Additionally, or alternatively, if first estimated map data that is generated based on first sensor data from a first sensor is consistent with the stored map data, but second estimated map data that is generated based on second sensor data from a second sensor is inconsistent with the stored map data, the error may be associated with the second sensor.

In any of these examples described above and herein, the vehicle may perform one or more remedial action(s) based at least in part on which system the error may be associated with. For instance, such remedial measures can include, but are not limited to: sending an indication of the error to a remote operator (whether human or another machine) associated with the vehicle, dispatching a second vehicle to the area where a map error occurred to generate a new stored map of the environment, causing the sensor data to be stored for generation of the new stored map, causing the vehicle to prioritize the estimated map over previous map data, causing a fleet of vehicles to refrain from traversing the area in the environment where a map error occurred, causing the vehicle to perform a safe stopping maneuver, modifying a weight associated with such data for use in other determinations (e.g., planning, perception, etc.), causing the vehicle to follow a trajectory of another vehicle for a threshold period of time to determine if the error subsides, causing a perception system of the vehicle to associate a lower confidence score with the sensor data, causing a sensor system of the vehicle to be recalibrated, and/or the like.

In various examples, maps used by autonomous vehicles may be generated before the vehicle is in an environment and stored for subsequent retrieval and use when the vehicle is traversing the environment. These stored maps may include various information associated with the environment (e.g., indications of on-road portions, off-road portions, drivable surfaces, non-drivable surfaces, traffic control annotations, such as lane markings, traffic signs, traffic lights, and the like) and, using a pose of the vehicle, the vehicle may use a stored map to generate a planned trajectory (e.g., speed, steering angle, etc.) to navigate through the environment. In some instances, this data that may be used by the vehicle to plan maneuvers may be unreliable. For example, a perceived or sensed pose or location may not accurately reflect a position of the vehicle in the environment. In other instances, environments may change (e.g., emergent route changes, construction zones, ground condition changes, lanes being repainted, etc.), and a stored map may not be updated to reflect such changes. Pose data, sensor data, localization data, and/or a stored map may be used to determine a planned trajectory for the vehicle, and if one of these is in accurate, then the planned trajectory may chart a course that, if executed, inadvertently crosses elements in the environment (e.g., off-road areas, curbs, lane lines, and the like).

The techniques of this disclosure may determine whether a stored map of an environment is reliable, which may increase the likelihood that the stored map accurately reflects the environment and that a planned trajectory based on the stored map charts a course across intended portions of the environment. For example, an estimated map may be generated using sensor data (e.g., image data, lidar data, etc.), and the estimated map may include various data. In some instances, the estimated map may include various information associated with, or indicating, elements of interest in the environment (e.g., semantic information indicating off-road areas, on-road areas, solid lane lines, dash lane lines, and the like). The estimated map may be compared to a stored map to determine consistency, and if the consistency is high enough (e.g., meets or exceeds a threshold level of associations), the stored map may be deemed reliable and/or any data used to generate the estimated map (e.g., vehicle pose) may be deemed reliable. Conversely, if a level of consistency between the stored map and the estimated map is below a threshold level (e.g., a majority of the stored map features and the estimated map features align, but some threshold amount does not), the stored map, or data used to generate the stored map data, may be determined to be unreliable. In some instances, an inconsistency that is indicative of a stored map error may be caused by the stored map being out of date due to a world change event (e.g., road surface markings being repainted or repositioned, change in location of traffic lights or traffic signs, construction zones, etc.). This may be verified based on the sensor data, additional vehicles, remote operators, and the like. In at least some such examples, this scenario may trigger a remapping objective for one or more vehicles or operators given the identified misalignment.

Additionally, or alternatively, the techniques described herein may determine the reliability of a localization system of the vehicle that may be used to, among other things, plan trajectories, determine a pose of the vehicle, determine a position of the vehicle within the environment, and the like. For example, the estimated map with the semantic information may be compared to the stored map, and if an inconsistency between the estimated map and the stored map can be remedied by a realignment of the estimated map or the stored map relative to one another, then the inconsistency may be indicative of an error associated with the localization system. Conversely, if the estimated map is consistent with the stored map, then the localization system of the vehicle may be validated as operating properly. In either case, a remedial action may be made such as, for example, altering the localization to reflect the error, reducing a confidence of a localization system (which, in turn, may increase a safety margin between the vehicle and other objects, speeds at which the vehicle travels, and the like), or otherwise.

In addition, the techniques of this disclosure may be used to verify the reliability of sensor data used by the vehicle to plan a trajectory. For example, the estimated map with the semantic information may be compared to the stored map, and if an inconsistency between the estimated map and the stored map is greater than a threshold inconsistency and/or cannot be remedied (e.g., the stored map and the estimated map cannot be realigned to correspond with one another), then the inconsistency may be indicative of an error associated with the sensor data and/or a sensor system of the vehicle. Conversely, if the estimated map is consistent with the stored map, then the sensor data and/or sensor system(s) of the vehicle may be validated as operating properly. In other words, remedial actions may not be performed if the estimated map is consisted with the stored map, and the vehicle may rely equally on the stored map and the estimated map while traversing the environment.

In some aspects of the disclosure, multiple estimated maps may be generated to be compared to the stored map. For example, one estimated map may be generated based on image data, and another estimated map may be generated based on lidar data. Both the image estimated map and the lidar estimated map may be compared to the stored maps, which may provide multi-modal redundancy and multiple levels of consistency checking. Furthermore, if one of the image estimated map or the lidar estimated map is inconsistent with the stored map, the inconsistency may be indicative of which sensor and/or sensor system (e.g., the lidar sensor(s) or the image sensor(s)) may be experiencing an error and/or need calibration.

According to the techniques described herein, reliability of vehicle systems and stored maps can be improved. By improving the reliability and consistency of systems, maps, and other data used by autonomous vehicle to traverse an environment, the safety associated with operating autonomous vehicles in safety-critical environments where human beings, vehicles, personal and public property, and other objects may be present can be improved. Additionally, the techniques described herein improve vehicle-related technology for autonomous, semi-autonomous, and non-autonomous vehicles by increasing the redundancy for determining whether systems, components, or data that is used by those vehicles to traverse an environment is unreliable.

By way of example, and not limitation, a method according to this disclosure may include techniques of receiving sensor data associated with an environment in which a vehicle is operating. The vehicle may comprise an autonomous vehicle. In some examples, the sensor data may include one or more of image data captured by one or more image sensors (e.g., cameras) of the vehicle, lidar data captured by one or more lidar sensors of the vehicle, radar data captured by one or more radar sensors of the vehicle, time of flight, ultrasonics, and the like.

The techniques may also include generating or otherwise determining estimated map data based at least in part on the sensor data. In some examples, the estimated map data may represent the environment from a top-down perspective. That is, the estimated map data may include or be determined based at least in part on top-down scene data representing the environment from a top-down perspective. The top-down scene data may represent any one of the types of sensor data described herein, combinations of the different types of sensor data described herein, as well as sensor data types not described herein. Of course, the disclosure is not meant to be so limiting. Any map representation is contemplated.

In some instances, the estimated map data may indicate detected locations of traffic control annotations relative to the vehicle. As used herein, a "traffic control annotation" may mean a lane boundary, a road surface marking, a traffic sign, a traffic light, a lane barrier (e.g., curb, guard rail, fence, etc.), and the like. In some examples, the estimated map data may be generated by a perception system of the vehicle. As a non-limiting example of which, semantic information of objects detected in such sensor data (e.g., lane markings, traffic lights locations, traffic signs, and the like) may be associated with a position and/or orientation (and, in the case of traffic lights, for example, a set of states (e.g., red, yellow, green, etc.)) and may subsequently be associated with a map (the estimated map).

In some instances, the techniques include receiving stored map data based at least in part on the sensor data (e.g., by determining based at least in part on the sensor data one or more of a position and/or orientation of the vehicle and determining an associated portion of a map using, for example, a database). The stored map data may indicate predicted or expected locations of the traffic control annotations relative to the vehicle. In some examples, the stored map data may be received from a map(s) component of the vehicle based at least in part on a sensed pose and/or location of the vehicle. For instance, a localization component may predict a position and/or orientation of the vehicle within the environment, and the received map data may correspond with the predicted position and/or orientation of the vehicle.

In some examples, the stored map data may be compared with the estimated map data. For instance, the stored map data and the estimated map data may be compared by projecting the stored map data onto the estimated map data, projecting the estimated map data onto the stored map data, overlaying the map data on top of each other, side by side comparison, or otherwise evaluating the data in a common coordinate system. In some instances, a machine-learned model may compare the stored map data and the estimated map data, or some other non-machine learned algorithm may compare the stored map data.

The techniques may also include, in some instances, determining an inconsistency between the estimated map data and the stored map data. In at least one example, the inconsistency may be determined based at least in part on the comparing. As one example, the inconsistency determined between the map data may be an inconsistency between a detected location of a traffic control annotation and a predicted location of the traffic control annotation. For instance, a road surface marking or other change associated with the environment may have taken place such that the stored map data is no longer an accurate representation of the environment. Additionally, or alternatively, the inconsistency may be an inconsistency between a detected location of a static object and a predicted location of the static object, as well as other features represented in both the estimated and stored map data (e.g., drivable v. non-drivable surfaces, locations and/or orientations of objects, and the like).

In some examples, the techniques include determining whether the inconsistency is attributable to an error associated with the stored map data, the sensor data, or a localization system of the vehicle. As an example, it may be determined that the error is associated with the stored map data if the inconsistency is between a first portion of the estimated map data and a first corresponding portion of the stored map data (e.g., predicted location and detected location of a first traffic control annotation do not align) and there is a consistency between a second portion of the estimated map data and a second corresponding portion of the stored map data (e.g., predicted location and detected location of one or more other traffic control annotation(s) are in alignment). As another example, it may be determined that the error is associated with the map data based at least in part on an intensity (e.g., intensity of paint brightness, reflectivity, contrast, sharpness, etc.) associated with a road surface marking represented in the estimated map data. For instance, the intensity may be indicative of an age of the road surface marking, and newer road surface markings may have a greater intensity than older road surface markings. As yet another example, it may be determined that the error is associated with the localization system of the vehicle based at least in part on determining that a realignment of the stored map data and the estimated map data would remedy the inconsistency.

In various examples, the vehicle may perform one or more specific remedial action(s) based at least in part on determining that the error is associated with the stored map data, the sensor data, or the localization system. In some instances, different remedial actions may be performed in response to different, respective errors. For instance, if the error is associated with the stored map data, the remedial action(s) may include one or more of sending an indication of the error to a teleoperator, dispatching a second vehicle to the area in the environment where the error occurred to generate new map data, causing the sensor data to be stored for generation of the new map data, causing the vehicle to prioritize the estimated map data over the stored map data (e.g., when planning), causing a fleet of vehicles to refrain from entering the area where the map error took place, and/or the like. As another example, if the error is associated with the localization system, the remedial action(s) may include one or more of sending an indication of the error to the teleoperator, causing the vehicle to perform a safe stopping maneuver, causing the vehicle to follow a trajectory of another vehicle for a threshold period of time, and/or the like. As yet another example, if the error is associated with the sensor data and/or a sensor system of the vehicle, the remedial action(s) may include causing a perception system of the vehicle to associate a lower confidence score with the sensor data, causing a sensor system of the vehicle to be recalibrated, and the like. However, any remedial actions described herein can be performed in response to any determined error, regardless of whether the error is associated with the map data, the sensor data, the localization system, or any other systems of the vehicle.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles in which such a component may provide an indication to a driver of the vehicle. In another example, the techniques can be utilized in an aviation or nautical context, or in any component involving objects or entities that may be associated with behavior that is unknown to the component. In some examples, the techniques can be utilized in contexts outside of autonomous vehicles. Furthermore, the techniques described herein can be used with real data (e.g., captured using sensor(s)), simulated data (e.g., generated by a simulator), or any combination of the two.

Additionally, the techniques of this disclosure may provide various advantages or benefits. For instance, in some cases, the techniques described may provide safer vehicle operation, such as by reducing the likelihood that a driving maneuver is executed based on unreliable data, systems, or components. Further, reliability of vehicle systems and stored maps can be improved according to these techniques. By improving the reliability and consistency of systems, maps, and other data used by autonomous vehicles to traverse an environment, the safety associated with operating autonomous vehicles in safety-critical environments where human beings, vehicles, personal and public property, and other objects may be present can be improved. Additionally, the techniques described herein improve vehicle-related technology for autonomous, semi-autonomous, and non-autonomous vehicles by increasing the redundancy for determining whether systems, components, or data that is used by those vehicles to traverse an environment is unreliable.

FIG. 1 is a pictorial flow diagram illustrating an example process 100 in which sensor data may be used to verify consistency between map data stored by a vehicle and an environment in which the vehicle is operating, as well as to validate operation of one or more systems or components of the vehicle. In at least one example, the process 100 or steps depicted in the process 100 may be performed by one or more computing devices onboard a vehicle 102, such as an autonomous vehicle, or by a remote computing device (e.g., server in a data center) that is accessible by the vehicle 102. In addition, the computing device(s) can include components for controlling the vehicle 102. Additional details associated with the vehicle 102 and the computing device(s) and/or component(s) associated therewith are described below with reference to FIG. 6.

In at least one example, the vehicle 102 may be associated with one or more sensor components. In at least one example, the sensor component(s) may capture data associated with an environment 104 surrounding the vehicle 102. In at least one example, the sensor component(s) may include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. The sensor component(s) may generate sensor data, which may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc.

In at least one example, cameras onboard the vehicle 102 may provide image data 106 (e.g., image(s) captured by camera(s)) to a map estimation component 108. In at least one example, the image data 106 may include images from various cameras that are disposed about the vehicle 102 to capture various angles of the environment 104 within which the vehicle 102 is positioned. For example, in at least one example, the image data 106 may include images from multiple (e.g., two, four, eight, sixteen, etc) different cameras which can capture multiple different portions of the environment 104.

In at least one example, lidar sensors onboard the vehicle 102 may provide lidar data 110 to the map estimation component 108. In at least one example, the lidar data 110 may be associated with point clouds in a grid (e.g., with designated dimensions such as 320×192). In at least one example, the lidar data may be associated with one or more features, which can include grid occupancy (e.g., a binary and/or probability a portion of the environment is occupied), grid density, maximum_z (max_z) (e.g., a highest lidar point on a z-axis of a multi-dimensional coordinate system), maximum_z divided into two or more bins (max_z divided into bins), minimum_z (min_z) (e.g., a lowest lidar point on the z-axis), intensity at minimum_z (min_z), etc.

The map estimation component 108 may include one or more components for processing the image data 106, the lidar data 110, and/or other sensor modalities associated with the sensor component(s) onboard the vehicle 102. In at least one example, the map estimation component 108 may include a map estimation component as described in U.S. patent application Ser. No. 16/856,826 (titled "Map Consistency checking component" and filed Apr. 23, 2020), which is incorporated herein by reference in its entirety and for all purposes. The map estimation component 108 may include sensor data converters as describe in U.S. patent application Ser. No. 17/227,002 (titled "Verifying Reliability of Data Used for Autonomous Driving" and filed Apr. 9, 2021), which is incorporated herein by reference in its entirety and for all purposes. For instance, the map estimation component may include an image data converter that is configured to receive the image data 106 and process the image data 106, for example, using one or more machine learned models (e.g., using one or more neural networks, such as a residual neural network, a fully connected neural network, or the like), one or more image processing techniques, a combination of the foregoing, or the like Additionally, the map estimation component 108 may also include a lidar data converter that is configured to receive the lidar data 110 and process the lidar data 110, for example, using one or more machine learned models (e.g., using a neural network, such as a residual neural network).

In some examples, the map estimation component 108 may generate and/or output estimated map data 112 based at least in part on sensor data, such as the image data 106 and/or the lidar data 110. In some examples, the estimated map data 112 may represent the environment 104 surrounding the vehicle 102 from a top-down perspective. In at least one example, the map estimation component may determine an image estimated map based on the image data 106, as well as a lidar estimated map based on the lidar data 110, and the estimated map data 112 may be a fusion of the image estimated map and the lidar estimated map.

In at least one example, the image estimated map and the lidar estimated map may be represented as top-down representations of the environment 104 surrounding the vehicle 102. In such an example, the image estimated map and the lidar estimated map may be centered on the vehicle 102. The image estimated map and the lidar estimated map may include encoded data. Such data may encode information determined from the respective data sources and associated with the environment 104 in the estimated maps, which can include, but is not limited to policy information pertaining to the rules of the road (e.g., driving lanes, drivable surfaces, non-drivable surfaces, intersections, sidewalks, traffic control annotations, etc.).

As noted above, the map estimation component 108 may combine (or otherwise fuse) the image estimated map data and the lidar estimated map data into the estimated map data 112, which may include information from both the top-down representation, as well as feature representations regarding object types, bounding boxes, movement information, and the like. In at least one example, the estimated map data 112 can represent an average computed based at least in part on the image estimated map and the lidar estimated map. Of course, any other method for combining the estimated maps is contemplated, including, but not limited to, use of Bayesian techniques. Furthermore, while two different components and/or models (e.g., neural networks) are described for processing the image data 106 and the lidar data 110, in an additional or alternative example, a single component and/or single model can be used to generate the estimated map data 112. Moreover, while FIG. 1 refers to image data 106 and lidar data 110, any type of sensor data can be provided as an input for generating the estimated map data 112. In at least some examples, objects associated with a moveable type (e.g., pedestrians, vehicles, etc.) may be disregarded when compiling the estimated map.

As indicated above, the estimated map data 112 may include encoded policy data pertaining to various elements of the environment 104, such as driving lanes, lane lines, drivable surfaces/non-drivable surfaces, intersections, sidewalks, traffic control annotations, and the like as may be determined from the sensor data. In some instances, estimations related to the encoded policy data may be inaccurate due to occlusion, complicated road structure, etc. As such, the map estimation component 108 may also output confidence value data associated with the estimated map 112.

In at least one example, the one or more computing devices onboard the vehicle 102 can include a localization component. The localization component can determine a pose (position and/or orientation) of the vehicle 102 in relation to a local and/or global map based at least in part on sensor data received from the sensor component(s) and/or map data associated with a map. In at least one example, determined vehicle pose data 114 may be input into a map component 116. Furthermore, a local and/or global map (e.g., representing the environment 104) may be obtained from memory of the vehicle 102 (e.g., remotely stored on onboard the vehicle 102), and the local and/or global map may be provided as a map input 118 into the map component 116. In at least one example, the local and/or global map may be a "stored map" that has been generated, at least in part, by previous data collection efforts. In at least one example, the stored map can be a top-down representation of the environment 104 and can be encoded with information associated with the environment 104, which can include, but is not limited to policy information pertaining to the rules of the road (e.g., driving lanes, lane lines, drivable surfaces, non-drivable surfaces, intersections, sidewalks, traffic control annotations, etc.). In some examples, the stored map may be a physical map representing the environment and, in other examples, the stored map may a semantic map that includes semantic data associated with the environment. Of course, various other representations, combinations (e.g., physical and semantic combined into a single map), etc. are contemplated.

In at least one example, the map component 116 can utilize the vehicle pose data 114 and the map input 118 to determine a portion of the environment 104 surrounding the vehicle 102. That is, the map component 116 may access the local and/or global map and, based at least in part on the vehicle pose data 114, determine a portion of the local and/or global map that is surrounding the vehicle 102. Data encoded in such a top-down representation can be called "stored map data" 120 (e.g., which is a sub-area of the map input 118). A non-limiting example of a stored map and/or associated data is shown in FIG. 1. Such stored map data 120 can be used for checking the consistency of the map input 118, or information derived therefrom, as described below.

In at least one example, the estimated map data 112 is used to determine the reliability of the stored map data 120, the sensor data (e.g., the image data 106, lidar data 110, pose data 114), and/or the localization component. For example, the estimated map data 112, and the stored map data 120 may be input to a consistency checking component 122. The consistency checking component 122 may determine whether the stored map data 120, the sensor data, or pose data 114 is reliable by comparing the estimated map data 112 with the stored map data 120. In at least one example, the consistency checking component 122 can utilize one or more consistency "checks" or evaluations to evaluate portions of the environment 104 (e.g., which can be associated with individual, associated pixels of the estimated map data 112 and the stored map data 120). A low consistency (e.g., does not meet a threshold) may suggest that the stored map data 120 does not accurately reflect the environment 104, such as if the environment 104 has changed since the map input data 118 was originally created. In other instances, a low consistency may also indicate inaccurate pose data 114, or inaccurate sensor data (e.g., image data 106 and/or lidar data 110). In some examples, an optical flow algorithm can be used to determine differences between the stored map data 120 and the estimated map data 112, which can be used to determine consistency. In other examples, such consistency may be determined based on, for example, a pure difference, a weighted difference (e.g., based on confidence values), or the like.

In at least one example, the consistency checking component 122 can output consistency scores, overlap or alignment scores, and confidence ratings (e.g., quantifying the reliability of the stored map data 120) associated with one or more consistency checks. For example, based at least in part on comparing the estimated map data 112 with the stored map data 120, the consistency checking component 122 can output a confidence score indicating that a pose of the vehicle 102 is reliable, a confidence score indicating that the sensor data and/or sensors of the sensor system are reliable, and/or a confidence score indicating that the stored map data 120 is reliable. In some examples, the confidence scores can be associated with indications of sources of inconsistencies.

In some examples, if an inconsistency is determined between the estimated map data 112 and the stored map data 120 by the consistency checking component 122, the estimated map data 112 and the stored map data 120 may be provided to a diagnostic component 124 of the vehicle 102. The diagnostic component 124 may include functionality 126 to determine whether the inconsistency is attributable to a map error, a sensor error, a localization error, etc. That is, the diagnostic component 124 may determine whether an inconsistency is caused by an error associated with the sensor data (e.g., the image data 106 or the lidar data 110) or the sensor system(s), the pose data 114 (e.g., localization system error), the map(s) component 116, the map input data 118, or the stored map data 120. For instance, the diagnostic component 124 may attempt to realign the estimated map data 112 and the stored map data 120 (e.g., translated, rotated, shifted, etc. relative to one another) to remedy the inconsistency, which may be indicative that the error is associated with the localization system. As another example, the diagnostic component 124 may determine whether first corresponding portions of the estimated map data 112 and the stored map data 120 are in alignment and second corresponding portions of the estimated map data 112 and the stored map data 120 are inconsistent, which may be indicative that the error is associated with the stored map data 120. As yet another example, the diagnostic component 124 may determine whether a majority of the map features are not aligned and cannot be realigned (e.g., to reduce an amount of error or misalignment to at or below some threshold amount), which may be indicative that the error is associated with the sensor data or the sensor system. The diagnostic component 124 may additionally look at other factors and/or differences between the estimated map data 112 and the stored map data 120 to diagnose the error, such as location of static objects, intensity of road surface markings, changes in topography, and the like.

In at least one example, the diagnostic component 124 may send an indication of the error, as well as whether the error is associated with the sensor data, localization system, map system, etc., to the remedial action component 128. The remedial action component 128 may include functionality 130 to determine, based at least in part on the indication received from the diagnostic component 124, whether to notify a teleoperator, cause the vehicle 102 to perform a safe stopping maneuver, cause the sensors of the vehicle 102 to be recalibrated, initiate a remapping of the environment 104, and the like. In some examples, the remedial action component 128 may send a request for instructions to a remote computing device (e.g., associated with teleoperators) in response to an error indication. Furthermore, in at least one example, if the error indication indicates that the stored map data 120 is not consistent with the estimated map data 112, the remedial action component 128 can determine to use the estimated map data 112 instead of the stored map data 120, at least until the inconsistency is resolved. Moreover, if the error indication indicates that the stored map data 120 is not consistent with the estimated map data 112, the remedial action component 128 may initiate a remapping of the area by using different sensors, different mapping techniques, different perception approaches, more sophisticated sensors, higher fidelity data, and the like. Further still, map information may be temporally weighted for consideration by subsequent processes (e.g., more recent map data is weighted higher). In an additional or alternative example, the vehicle 102 may alter a planned trajectory to include regions of high consistency (e.g., confidence score(s) that meet or exceed respective threshold(s)) and avoid regions of low consistency (e.g., confidence score(s) below respective threshold(s)). That is, the confidence score(s) can be input into a planner component, described below in association with FIG. 6, for use in determining and/or modifying a trajectory along which the vehicle 102 can travel.

Figure 2:
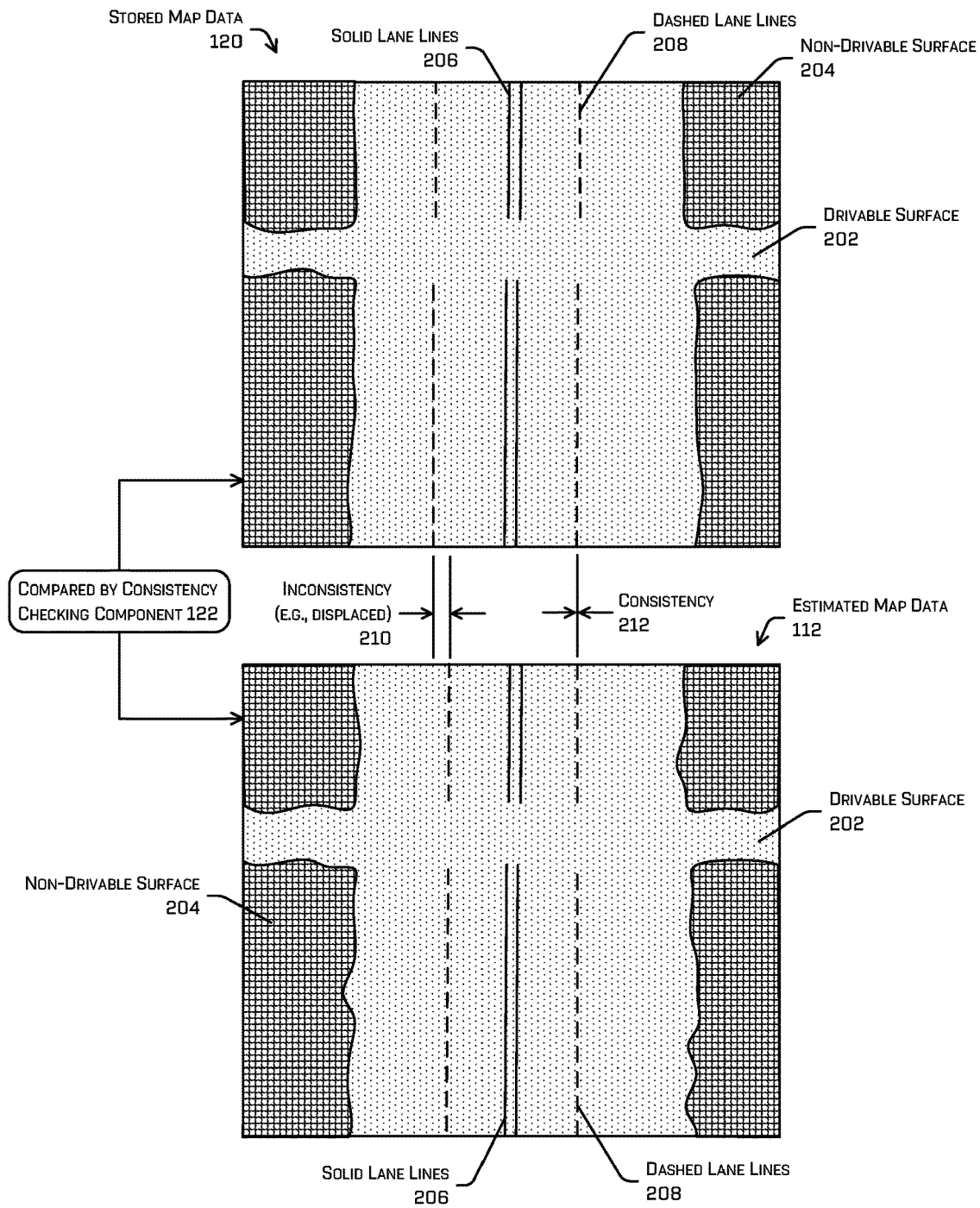
FIG. 2 illustrates an example comparison of stored map data and estimated map data in which an inconsistency between the stored map data and estimated map data is attributable to an error associated with the stored map data.

FIG. 2 illustrates an example comparison 200 of stored map data and estimated map data in which an inconsistency between the stored map data and estimated map data is attributable to an error associated with the stored map data. The comparison 200 may be performed at least in part by the consistency checking component 122, as shown.

Both the estimated map data 112 and the stored map data 120 shown in FIG. 2 (as well as FIGS. 3 and 4 below) are multi-channel, top-down representations (multi-channel top-down scene data) of the environment 104 surrounding the vehicle 102. As illustrated, both the estimated map data 112 and the stored map data 120 may include labels (e.g., masks) that indicate portions of the environment 104 that are associated with drivable surfaces 202 and non-drivable surfaces 204. Furthermore, traffic control annotations, such as lane lines indicating driving lanes are also depicted. For example, solid lane lines 206 are shown in both the estimated map data 112 and the stored map data 120, as well as dash lane lines 208. In a further aspect of the disclosure, the estimated map data 112 may include per pixel data associated with pixels of the estimated map data 112, as described in U.S. patent application Ser. No. 17/227,002.

In additional or alternative examples, the estimated map data 112 and the stored map data 120 can include additional or alternative map data, which can comprise traffic control annotations such as lane markings, lane boundaries, one or more lane references (e.g., illustrating a centerline associated with a lane and/or a route between available (e.g., legal) lanes). Additional examples of traffic control annotations that can be represented in map data can include, but are not limited to, one or more of a lane element, a bike lane element, a crosswalk element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like. In at least one example, the map elements described above can comprise at least a portion of the "policy information" described above and herein.

As illustrated, when compared by the consistency checking component, the estimated map data 112 and the stored map data 120 are inconsistent. That is, an inconsistency 210 is shown in which the left-most dashed lane lines 208 in the estimated map data 112 are displaced from the left-most dashed lines 208 in the stored map data 120. However, other than the inconsistency 210, the rest of the stored map data 120 is consistent with the estimated map data 112. For instance, a consistency 212 exists between the right-most dashed lane lines 208 in the estimated map data 112 and the stored map data 120, as well as other consistencies. The presence of the inconsistency 210 and the consistency 212 can be indicative of an error associated with the stored map data 120. For instance, the inconsistency 210 may be a result of the lane lines having been repainted at some time after the stored map data 120 was updated. In some examples, the inconsistency 210 (e.g., difference) may meet or exceed a threshold. For example, a threshold may include x pixels (e.g., 5 pixels), such that a displacement amount of more than x pixels suggests lower reliability, whereas a displacement amount of x pixels or less may be deemed to not reduce the reliability of stored map data or information used to generate stored map data.

The inconsistency 210 and the consistency 212 may be determined in various manners. For example, in an aspect of the disclosure, a comparison between the estimated map data 112 and the stored map data 120 is based on an optical flow algorithm (e.g., Lucas-Kanade optical flow method), which may be used to evaluate segmentation consistency as between the estimated map data 112 and the stored map data 120. In at least one example, the consistency checking component 122 can compare a first map element (e.g., a lane line) in the estimated map data 112 with a second map element (e.g., a lane line), that corresponds to a same feature or channel, in the stored map data 120. The consistency checking component 122 can determine a difference or other displacement between the first map element and the second map element, and if the difference or other displacement meets or exceeds a threshold, the consistency checking component 122 can determine an inconsistency between the stored map data 120 and the estimated map data 112. In at least one example, the difference and/or other displacement can be determined based at least in part on any extent of the map element (e.g., x, y, yaw). The consistency checking component 122 may compare each channel of the estimated map data 112 with a corresponding channel of the stored map data 120. The consistency data across multiple channels may be aggregated and compared to a threshold value, and/or each channel may be considered separately and compared to a per-channel threshold value.

As an example, for determining lane line consistency, the consistency checking component 122 can subtract dilated input associated with lane lines as indicated in the stored map data 120 with input associated with lane lines as indicated in the estimated map data 112 to generate line segments that can be perceived in the real world but are not present in the stored map data 120. In some examples, pixels associated with residual lines can be weighted by inverse their distance to the vehicle (e.g., because estimation may be better near the vehicle than farther away from the vehicle). In at least one example, if a connected component is associated with a weight that meets or exceeds a threshold, the consistency checking component 122 can determine an inconsistency between the stored map data 120 and the estimated map data 112.

Figure 3:
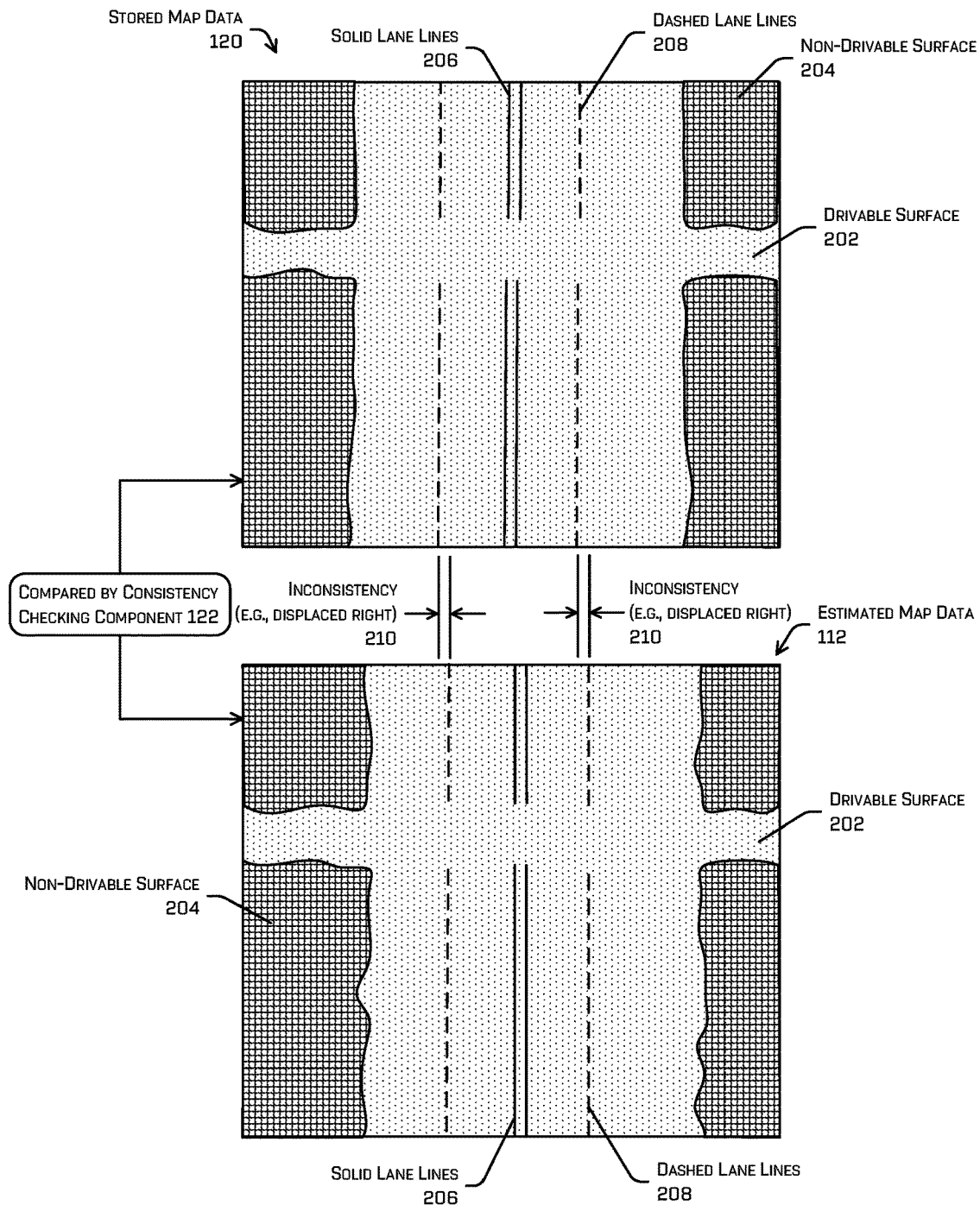
FIG. 3 illustrates another example comparison of stored map data and estimated map data in which an inconsistency between the stored map data and estimated map data is attributable to an error associated with a localization system of a vehicle.

FIG. 3 illustrates another example comparison 300 of stored map data and estimated map data in which an inconsistency between the stored map data and estimated map data is attributable to an error associated with a localization system of a vehicle. The comparison 300 may be performed at least in part by the consistency checking component 122, as shown.

As illustrated, when compared by the consistency checking component 122, the estimated map data 112 and the stored map data 120 are inconsistent. That is, inconsistencies 210 are shown in which the dashed lane lines 208 in the estimated map data 112 are displaced to the right from the dashed lines 208 in the stored map data 120. However, because both of the dashed lanes 208 are displaced to the right, and the rest of the estimated map data 112 is displaced to the right of the stored map data 120, the inconsistencies 210 are indicative of an error associated with the localization system of the vehicle 102. For instance, it is possible to shift a frame of reference of the stored map data 120 to the left in order to align the stored map data 120 and the dashed lane lines 208 with the estimated map data 112, and this can be indicative of the localization system error In some examples, the inconsistencies 210 (e.g., difference) may meet or exceed a threshold. For example, a threshold may include x pixels (e.g., 5 pixels), such that a displacement amount of more than x pixels suggests lower reliability, whereas a displacement amount of x pixels or less may be deemed to not reduce the reliability of stored map data or information used to generate stored map data. In some examples, inconsistencies may be determined between drivable regions of the environment, as well as non-drivable regions.

Figure 4:
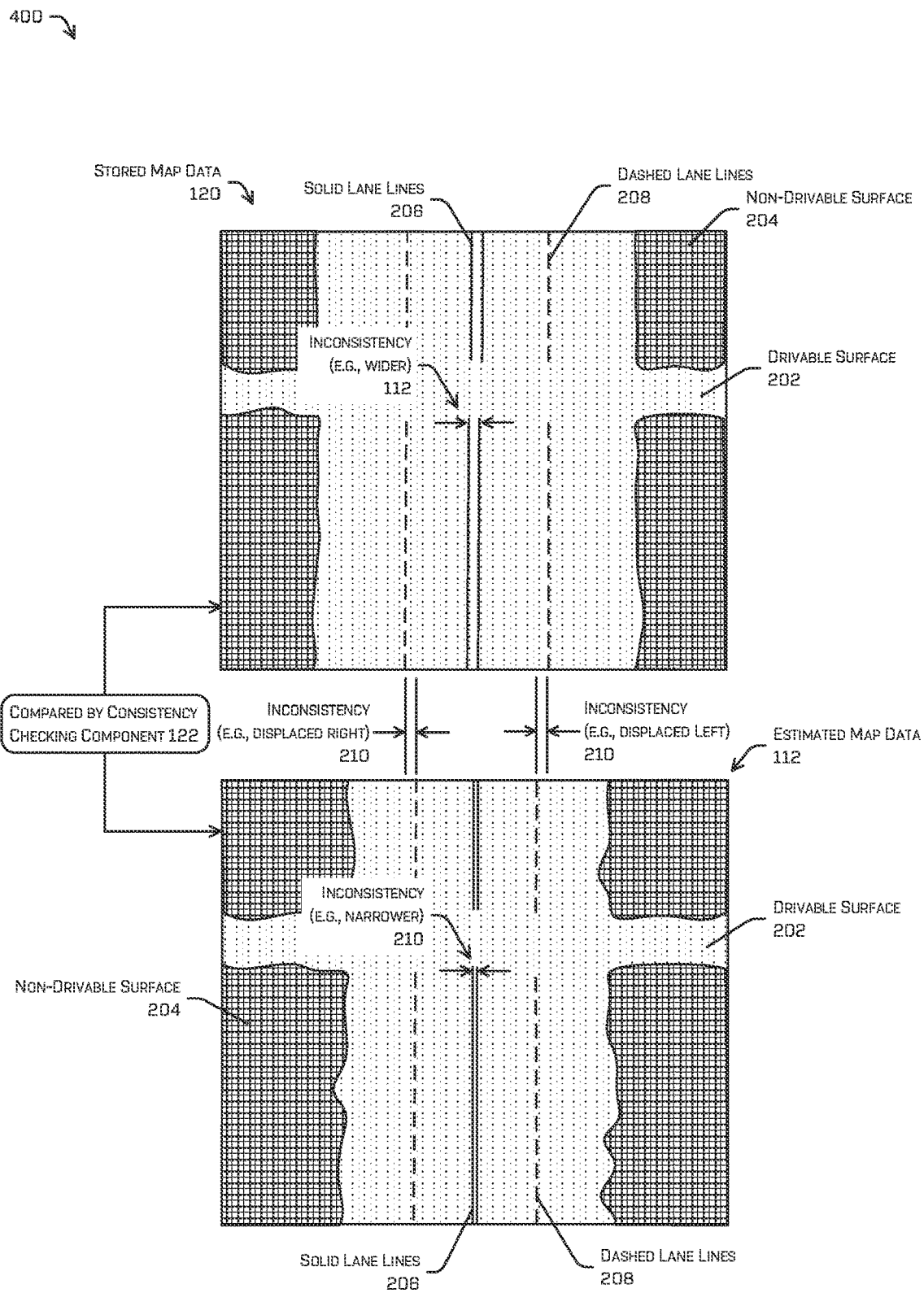
FIG. 4 illustrates yet another example comparison of stored map data and estimated map data in which an inconsistency between the stored map data and estimated map data is attributable to an error associated with a sensor system of the vehicle and/or sensor data.

FIG. 4 illustrates yet another example comparison 400 of stored map data and estimated map data in which an inconsistency between the stored map data and estimated map data is attributable to an error associated with a sensor system of the vehicle and/or sensor data. The comparison 400 may be performed at least in part by the consistency checking component 122, as shown.

As illustrated, when compared by the consistency checking component 122, the estimated map data 112 and the stored map data 120 are inconsistent. That is, inconsistencies 210 are shown in which the dashed lane lines 208 in the estimated map data 112 are displaced relative to the dashed lines 208 in the stored map data 120, and the solid lane lines 206 shown in the estimated map data 112 are narrower relative to the stored map data 120. However, because the stored map data 120 and the estimated map data 112 cannot be realigned to remedy the inconsistencies 210, and since more than a threshold amount, for instance, one lane line is inconsistent, the inconsistencies 210 may be indicative of an error associated with the sensor data and/or sensor system of the vehicle 102. In some examples, the inconsistencies 210 (e.g., difference) may meet or exceed a threshold. For example, a threshold may include x pixels (e.g., 5 pixels), such that a displacement amount of more than x pixels suggests lower reliability, whereas a displacement amount of x pixels or less may be deemed to not reduce the reliability of stored map data or information used to generate stored map data. In some examples, other threshold units of measurement may be used, such as feet, meters, pixels, etc., and thresholds may vary based on a distance from the vehicle. For instance, farther distances may have greater thresholds (e.g., 10 pixels) while shorter distances may have smaller thresholds (e.g., 5 pixels). In some examples, inconsistencies that may be indicative of sensor system-related errors may be inconsistencies that grow over distance (e.g., become greater further from the vehicle), inconsistencies in which the estimated map data is twisted relative to the stored map data, and the like.

Figure 5:
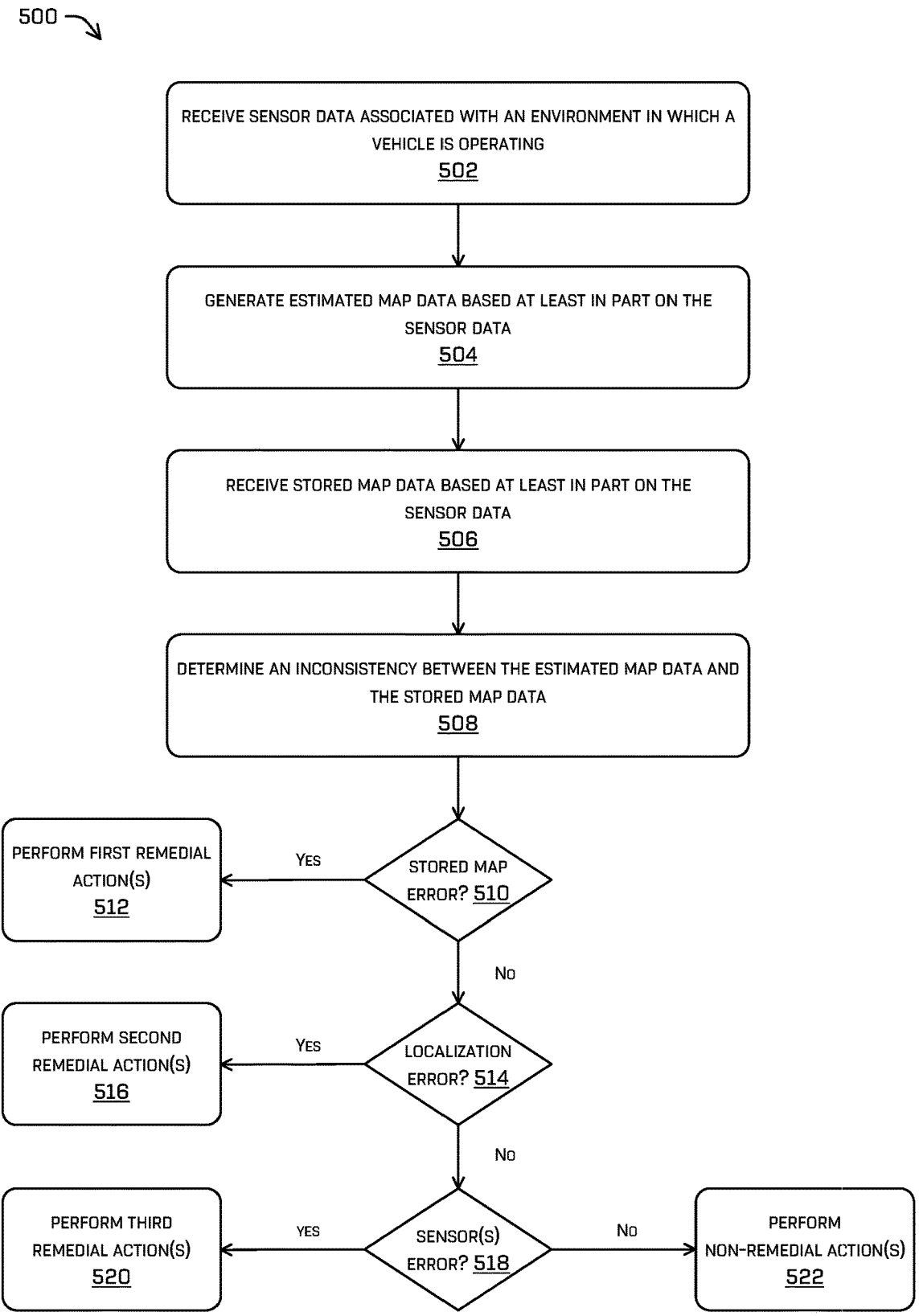
FIG. 5 is a flowchart illustrating an example process for determining whether an inconsistency between estimated map data and stored map data is attributable to an error associated with the stored map data, a sensor system of a vehicle, or a localization system of the vehicle.

FIG. 5 is a flowchart illustrating an example process 500 for determining whether an inconsistency between estimated map data and stored map data is attributable to an error associated with the stored map data, a sensor system of a vehicle, or a localization system of the vehicle. By way of example, the process 500 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 500. In some examples, multiple branches represent alternate implementations that may be used separately or in combination with other operations discussed herein. The process 500 illustrated may be described with reference to components and elements described above with reference to FIGS. 1, 2, 3, and 4 for convenience and ease of understanding. However, the process 500 is not limited to being performed using these components, and the components are not limited to performing the process 500.

The process 500 begins at operation 502, which includes receiving sensor data associated with an environment in which a vehicle is operating. For instance, the map estimation component 108 may receive the sensor data associated with the environment 104 in which the vehicle 102 is operating. In some examples, the sensor data may include the image data 106 and/or the lidar data 110, as well as other sensor data, such as radar data, time of flight data, and the like.

At operation 504, the process 500 includes generating estimated map data based at least in part on the sensor data. For instance, the map estimation component 108 may generate the estimated map data 112 based at least in part on the sensor data. That is, the map estimation component 108 may generate the estimated map data 112 based at least in part on the image data 106, the lidar data 110, and/or other sensor data. In some examples, the estimated map data may comprise a multi-channel image representing the environment 104 from a top-down perspective, wherein each channel of the multi-channel image represents different map features, such as road surface markings, static objects, drivable surfaces, and the like.

At operation 506, the process 500 includes receiving stored map data based at least in part on the sensor data. For instance, the consistency checking component 122 may receive the stored map data 120 based at least in part on the sensor data. In some examples, receiving the stored map data 120 is further based at least in part on the pose data 114 indicating a position or orientation of the vehicle 102 relative to the environment 104. The stored map data may, in some examples, comprise a multi-channel image representing the environment 104 from a top-down perspective.

At operation 508, the process 500 includes determining an inconsistency between the estimated map data and the stored map data. For instance, the consistency checking component 122 may determine the inconsistency between the estimated map data 112 and the stored map data 120. In some examples, the inconsistency may be determined to be between a detected location of a traffic control annotation and a stored or expected location of the traffic control annotation.

At operation 510, the process 500 includes determining whether the inconsistency is attributable to an error associated with the stored map data. For instance, the diagnostic component 124 may determine whether the inconsistency is attributable to an error associated with the stored map data 120. In some examples, whether the inconsistency is attributable to an error associated with the stored map data may be determined based at least in part on first corresponding portions of the estimated map and the stored map not indicating an inconsistency (e.g., a majority of map features are aligned), but second corresponding portions of the estimated map and the stored map including an inconsistency (e.g., some of the map features are not aligned) that cannot be realigned. Additionally, in some examples an intensity associated with a road surface marking may be indicative that the error is associated with the stored map data. That is, the intensity may indicate that the road surface marking is new. If it is determined that the error is associated with the stored map data, then the process 500 may proceed to operation 512. However, if the error is not associated with the stored map data, the process 500 proceeds to operation 514.

At operation 512, the process 500 includes performing one or more first remedial action(s). For instance, the remedial action component 128 may perform the one or more first remedial actions based at least in part on an indication that the error is associated with the stored map data 120. In some examples, the one or more first remedial actions may include sending an indication of the error to a human teleoperator associated with the vehicle, dispatching a second vehicle to the area where a map error occurred to generate a new stored map of the environment, causing the sensor data to be stored for generation of the new stored map, causing the vehicle to prioritize the estimated map, causing a fleet of vehicles to refrain from traversing the area in the environment where a map error occurred, causing the vehicle to perform a safe stopping maneuver, causing the vehicle to follow a trajectory of another vehicle for a threshold period of time to determine if the error subsides, causing a planning component of the vehicle to associate a lower confidence score with the stored map data, and/or the like.

At operation 514, the process 500 includes determining whether the inconsistency is attributable to an error associated with a localization system of the vehicle. For instance, the diagnostic component 124 may determine whether the inconsistency is attributable to an error associated with pose data 114 and/or the localization system of the vehicle 102. In some examples, whether the inconsistency is attributable to an error of the localization system may be determined based at least in part on determining that the estimated map and the stored map can be realigned (e.g., translated, rotated, shifted, etc. relative to one another) to remedy the inconsistency. If it is determined that the error is associated with the localization system, then the process 500 may proceed to operation 516. However, if the error is not associated with the localization system, the process 500 proceeds to operation 518.

At operation 516, the process 500 includes performing one or more second remedial action(s). For instance, the remedial action component 128 may perform the one or more second remedial actions based at least in part on receiving an indication that the error is associated with the localization system of the vehicle 102. In some examples, the one or more second remedial actions may include sending an indication of the error to a human teleoperator associated with the vehicle, causing the vehicle to perform a safe stopping maneuver, causing the vehicle to follow a trajectory of another vehicle for a threshold period of time to determine if the error subsides, and/or the like.

At operation 518, the process 500 includes determining whether the inconsistency is attributable to an error associated with the sensor data or a sensor system of the vehicle. For instance, the diagnostic component 124 may determine whether the inconsistency is attributable to an error associated with sensor data, such as the image data 106 or the lidar data 110, or an error associated with the sensor system of the vehicle 102. In some examples, determining whether the inconsistency is attributable to an error associated with the sensor data or a sensor system of the vehicle may be based at least in part on determining that a majority of the estimated map features and stored map features are not aligned and cannot be aligned. If it is determined that the error is associated with the sensor data or sensor system, then the process 500 may proceed to operation 520. However, if the error is not associated with the sensor data or sensor system, then the stored map data and the estimated map data are consistent and the process 500 proceeds to operation 522.

At operation 520, the process 500 includes performing one or more third remedial action(s). For instance, the remedial action component 128 may perform the one or more third remedial actions based at least in part on receiving an indication that the error is associated with the sensor data or the sensor system. In some examples, the one or more third remedial actions may include sending an indication of the error to a human teleoperator associated with the vehicle, dispatching a second vehicle to the area where the error occurred, causing the vehicle to perform a safe stopping maneuver, causing the vehicle to follow a trajectory of another vehicle for a threshold period of time to determine if the error subsides, causing a perception component of the vehicle to associate a lower confidence score with the faulty sensor data, causing the sensor system of the vehicle to be recalibrated, and/or the like.

At operation 522, the process 500 includes performing one or more non-remedial action(s). In some examples, the one or more non-remedial actions may include indicating that the estimated map data and the stored map data is consistent, indicating that the localization system of the vehicle is functioning properly, indicating that the sensor systems of the vehicle are functioning properly, causing the vehicle planning component to associate greater weight to the stored map data or the estimated map data, storing a date and/or time associated with the vehicle traversing the area in the environment where the map data has been validated, and the like.

Figure 6:
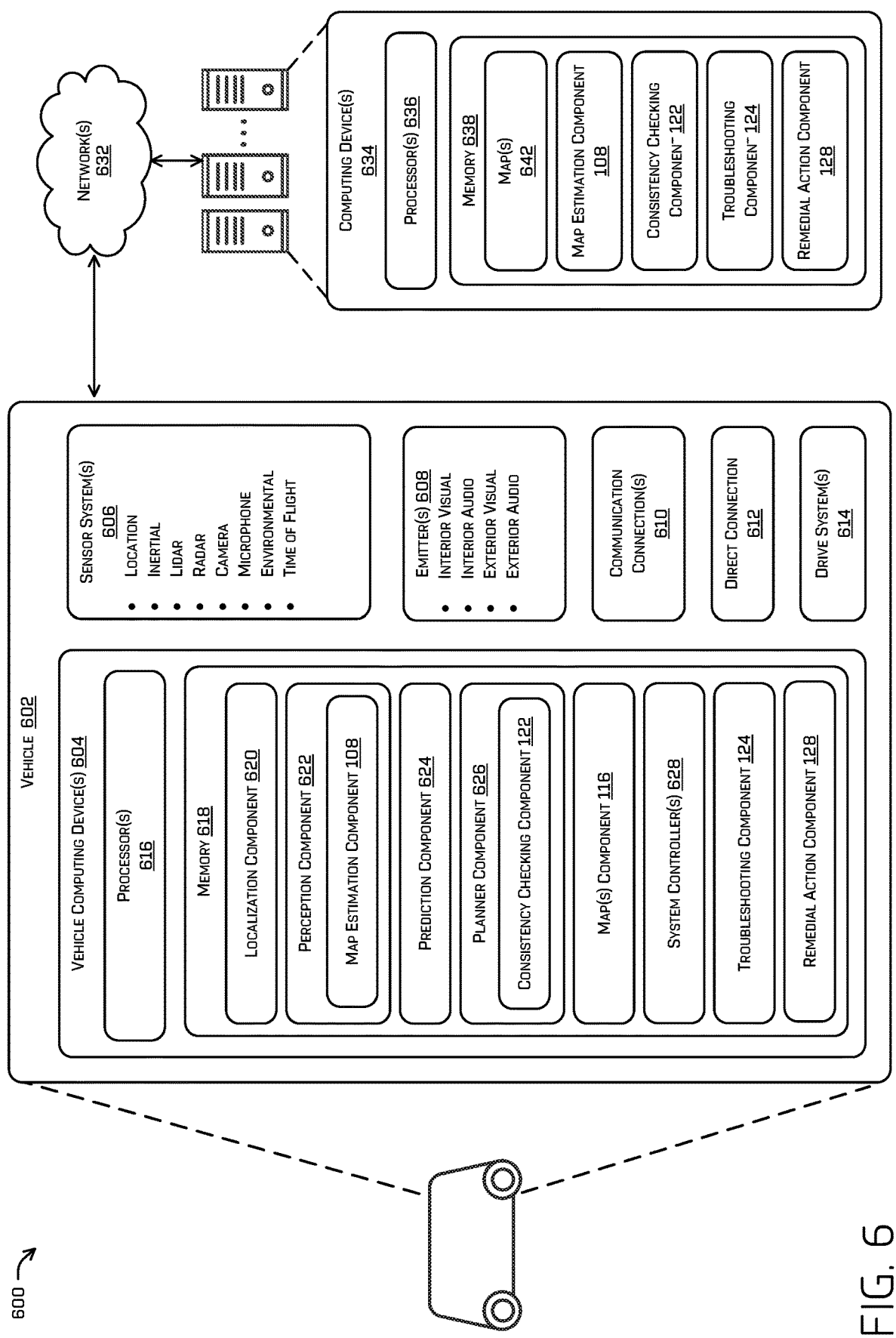
FIG. 6 is a block diagram illustrating an example system that may be used for performing the techniques described herein.

FIG. 6 is a block diagram illustrating an example system 600 that may be used for performing the techniques described herein. In at least one example, a vehicle 602, which can correspond to the vehicle 102 described above with reference to FIG. 1, can include one or more vehicle computing devices 604, one or more sensor systems 606, one or more emitters 608, one or more communication connections 610, at least one direct connection 612, and one or more drive systems 614.

In at least one example, a vehicle 602 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 602 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 602 is an autonomous vehicle; however, the vehicle 602 could be any other type of vehicle. While only a single vehicle 602 is illustrated in FIG. 6, in a practical application, the example system 600 can include a plurality of vehicles, which, in some examples, can comprise a fleet of vehicles.

The vehicle computing device(s) 604 can include processor(s) 616 and memory 618 communicatively coupled with the processor(s) 616. In the illustrated example, the memory 618 of the vehicle computing device(s) 604 stores a localization component 620, a perception component 622, a prediction component 624, a planner component 626, the map(s) component 116, one or more system controllers 628, the troubleshooting component 124, and the remedial action component 128. The map(s) component 116 may store (or retrieve from storage) map(s), model(s), previous outputs, etc. A map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. The stored maps referred to herein can correspond to at least some of the maps stored by the map(s) component 116.

In at least one example and as described above, the localization component 620 can determine a pose (position and orientation) of the vehicle 602 in relation to a local and/or global map based at least in part on sensor data received from the sensor component(s) 606 and/or map data associated with a map (e.g., of the map(s)). In at least one example, the localization component 620 can include, or be associated with, a calibration component that is capable of performing operations for calibrating (determining various intrinsic and extrinsic parameters associated with any one or more of the sensor component(s) 606), localizing, and mapping substantially simultaneously. The localization component 620 can, in some examples, provide pose data 114 to the map(s) component.

In at least one example, the perception component 622 can perform object detection, segmentation, and/or classification based at least in part on sensor data received from the sensor component(s) 606. In at least one example, the perception component 622 can receive raw sensor data (e.g., from the sensor component(s) 606). In at least one example, the perception component 622 can receive sensor data and can utilize one or more processing algorithms to perform object detection, segmentation, and/or classification with respect to object(s) identified in the sensor data. In some examples, the perception component 622 can associate a bounding region (or otherwise an instance segmentation) with an identified object and can associate a confidence score associated with a classification of the identified object with the identified object. In some examples, objects, when rendered via a display, can be colored based on their perceived class. In some examples, the perception component 622 may include the map estimation component 108.

The prediction component 624 can receive sensor data from the sensor component(s) 606, map data associated with a map (e.g., of the map(s) which can be in storage 330), and/or perception data output from the perception component 622 (e.g., processed sensor data), and can output predictions associated with one or more objects within the environment of the vehicle 602. Predictions can include predicted trajectories associated with objects in the environment in which the vehicle 602 is operating.

The planner component 626 may receive data, information, and/or outputs from the localization component 620, the perception component 622, the prediction component 624, and the map component 116 and may generate one or more proposed vehicle operations (e.g., proposed trajectories). In one example, the planner component 626 may include the consistency checking component 122. In other examples, the consistency checking component 122 may be part of the map(s) component 116 or an independent component. Additional details of localization components, perception components, prediction components, and/or planner components that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein in their entirety and for all purposes. In some examples (e.g., where the vehicle 602 is not an autonomous vehicle), one or more of the aforementioned components can be omitted from the vehicle 602.

The consistency checking component 122 can receive estimated map data from the map estimation component 108 and can compare estimated map(s) with stored map(s) (e.g., from the map component 116) to monitor the accuracy of the stored map(s), as described herein, as well as to monitor the accuracy of the sensor system(s) 606 and the localization component 620. As described above, in at least one example, the consistency checking component 122 can be independent from other components onboard vehicle 602 that estimate pose (e.g., the localization component 620). As will be apparent to those having ordinary skill in the art, the techniques described herein relate to independently-performed, redundant techniques for monitoring consistency between stored maps and estimated maps to ensure that other components onboard the vehicle 602 (e.g., the planner component 626, the localization component 620, the perception component 622, the map(s) component 116, and/or the sensor systems 606.) can safely rely on the stored maps and/or information derived therefrom to make decisions.

While the components described above are illustrated as "onboard" the vehicle 602, in other implementations, the components can be remotely located and/or accessible to the vehicle 602. For instance, the component can be remotely located on the computing devices 634 and accessible to the vehicle 602 via one or more networks 632. Furthermore, while the components are described above as "components," such components can comprise one or more components, which can be part of a system, for performing operations attributed to each of the components.

In at least one example, the localization component 620, the perception component 622, the prediction component 624, the planner component 626, the map estimation component 108, the consistency checking component 122, etc. can process sensor data, as described above, and can send their respective outputs over network(s) 632, to computing device(s) 634. In at least one example, the localization component 620, the perception component 622, the prediction component 624, the planner component 626, the map estimation component 108, and/or the consistency checking component 122 can send their respective outputs to the computing device(s) 634 at a particular frequency, after a lapse of a predetermined period of time, in near real-time, etc.

In at least one example, the vehicle computing device(s) 604 can include one or more system controllers 628, which can be configured to control steering, propulsion, braking, safety, emitters, communication, and other systems of the vehicle 602. These system controller(s) 628 can communicate with and/or control corresponding systems of the drive system(s) 614 and/or other systems of the vehicle 602.

In at least one example, the sensor component(s) 606 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 606 can provide input to the vehicle computing device(s) 604. In some examples, the sensor component(s) 606 can preprocess at least some of the sensor data prior to sending the sensor data to the vehicle computing device(s) 604. In at least one example, the sensor component(s) 606 can send sensor data, via the network(s) 632, to the computing device(s) 634 at a particular frequency, after a lapse of a predetermined period of time, in near real-time, etc.

The vehicle 602 can also include one or more emitters 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 608 can be positioned at various locations about the exterior and/or interior of the vehicle 602.

The vehicle 602 can also include communication connection(s) 610 that enable communication between the vehicle 602 and other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 632. For example, the communications connection(s) 610 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 612 can directly connect the drive system(s) 614 and other systems of the vehicle 602. In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include sensor component(s) to detect conditions of the drive system(s) 614 and/or the surroundings of the vehicle 602. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 614. In some cases, the sensor component(s) on the drive system(s) 614 can overlap or supplement corresponding systems of the vehicle 602 (e.g., sensor component(s) 606).

The drive system(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 614. Furthermore, the drive system(s) 614 also include communication connection(s) that enable communication by the respective drive system with other local or remote computing device(s).

In FIG. 6, the vehicle computing device(s) 604, sensor component(s) 606, emitter(s) 608, and the communication connection(s) 610 are shown onboard the vehicle 602. However, in some examples, the vehicle computing device(s) 604, sensor component(s) 606, emitter(s) 608, and the communication connection(s) 610 can be implemented outside of an actual vehicle (i.e., not onboard the vehicle 602).

As described above, the vehicle 602 can send sensor data to the computing device(s) 634, via the network(s) 632. In some examples, the vehicle 602 can send raw sensor data to the computing device(s) 634. In other examples, the vehicle 602 can send processed sensor data and/or representations of sensor data to the computing device(s) 634 (e.g., data output from the localization component 620, the perception component 622, the prediction component 624, the planner component 626, the map estimation component 108, and/or the consistency checking component 122). In some examples, the vehicle 602 can send sensor data to the computing device(s) 634 at a particular frequency, after a lapse of a predetermined period of time, in near real-time, etc.

The computing device(s) 634 can receive the sensor data (raw or processed) from the vehicle 602 and/or other data collection devices, as well as data from one or more third party sources and/or systems. In at least one example, the computing device(s) 634 can include processor(s) 636 and memory 638 communicatively coupled with the processor(s) 636. In the illustrated example, the memory 638 of the computing device(s) 634 stores one or more map(s) 642 for use by the vehicle 602 to navigate an environment, the map estimation component 108, the consistency checking component 122, the troubleshooting component 124, and the remedial action component 128. In this way, the computing devices 634 may perform remote processing and comparison of stored map data and estimated map data on behalf of the vehicle 602, as well as remote decision making, thus adding redundancy and additional compute power to the system 600. In some examples, one or more of the systems and/or components can be associated with the vehicle 602 or other computing device(s) associated with the system 600 instead of, or in addition to, being associated with the memory 638 of the computing device(s) 634.

The processor(s) 616 of the vehicle 602 and the processor(s) 636 of the computing device(s) 634 can be any suitable processor capable of executing instructions to process data and perform operations as described herein. By way of example and not limitation, the processor(s) 616 and 636 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 638 are examples of non-transitory computer-readable media. Memory 618 and 638 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in some examples, components of the vehicle 602 can be associated with the computing device(s) 634 and/or the components of the computing device(s) 634 can be associated with the vehicle 602. That is, the vehicle 602 can perform one or more of the functions associated with the computing device(s) 634, and vice versa.

Furthermore, while the vehicle computing device(s) 604 and the computing device(s) 634 are shown to include multiple components, in some examples, such components can be associated with more or fewer individual components. For example, in an example, a localization component, a perception component, a prediction component, and/or a planner component can be combined into a single component. Or, an annotation component, a training data generation component, and/or a training component can be combined into a single component. That is, while depicted as separate components, any one or more of the components can be combined.

EXAMPLE CLAUSES

A. A system comprising: one or more processors; and one or more non-transitory computer-readable media storing instructions that, when executed by the one or more processors, cause the system to perform operations comprising: receiving sensor data associated with an environment in which a vehicle is operating; generating, based at least in part on the sensor data, estimated map data indicating a detected location of a traffic control annotation relative to the vehicle; receiving, based at least in part on the sensor data, stored map data indicating at least an expected location of the traffic control annotation relative to the vehicle; comparing the stored map data with the estimated map data; determining, based at least in part on the comparing, an inconsistency between the detected location of the traffic control annotation and the expected location of the traffic control annotation; determining that the inconsistency is attributable to an error associated with at least one of the stored map data, a sensor system associated with the vehicle, or a localization system associated with the vehicle; and performing a remedial action based at least in part on determining that the error is associated with at least one of the stored map data, the sensor data, or the localization system.

B. The system as recited in paragraph A, wherein the error is associated with the stored map data and determining that the inconsistency is attributable to the error associated with the stored map data comprises: determining, based at least in part on the comparing, a consistency between a first portion of the stored map data and a first portion of the estimated map data; determining that the consistency does not meet or exceed a threshold; and determining an inability to align the estimated map data and the stored map data such that a resultant consistency meets or exceeds the threshold.

C. The system as recited in any one of paragraphs A-B, wherein the error is associated with the stored map data and the remedial action comprises one or more of: sending an indication of the error to a remote operator, dispatching a second vehicle to the detected location to gather additional sensor data, causing the sensor data to be stored for generation of updated map data, causing the vehicle to prioritize the estimated map data relative to the stored map data while traversing the environment, causing the vehicle to decelerate, or causing a fleet of vehicles to refrain from traversing an area in the environment corresponding with the inconsistency.

D. The system as recited in any one of paragraphs A-C, wherein the error is associated with the localization system and determining that the inconsistency is attributable to the error associated with the localization system comprises determining that a realignment of the stored map data and the estimated map data would remedy the inconsistency between the detected location of the traffic control annotation and the predicted location of the traffic control annotation.

E. A method comprising: receiving sensor data associated with an environment in which a vehicle is operating; generating estimated map data based at least in part on the sensor data; receiving stored map data based at least in part on the sensor data; determining an inconsistency between the estimated map data and the stored map data; determining whether the inconsistency is attributable to an error associated with the stored map data, a sensor system associated with the vehicle, or a localization system associated with the vehicle; and performing a remedial action based at least in part on determining that the error is associated with at least one of the stored map data, the sensor system, or the localization system.

F The method as recited in paragraph E, wherein the inconsistency between the estimated map data and the stored map data is an inconsistency between a first portion of the estimated map data and a first corresponding portion of the stored map data and is less than a threshold consistency, the method further comprising: determining a consistency between a second portion of the estimated map data and a second corresponding portion of the stored map data meets or exceeds a threshold consistency; and based at least in part on the inconsistency and the consistency, determining that the error is associated with the stored map data.

G. The method as recited in any one of paragraphs E-F, further comprising: determining that a realignment of the stored map data relative to the estimated map data would cause a consistency between the estimated map data and the stored map data to meet or exceed a threshold consistency; and determining that the error is associated with the localization system associated with the vehicle based at least in part on the realignment.

H. The method as recited in any one of paragraphs E-G, wherein the error is associated with the stored map data and the remedial action comprises one or more of: sending an indication of the error to a remote operator, dispatching a second vehicle to generate new map data of the environment, causing the sensor data to be stored for generation of updated map data, causing the vehicle to prioritize the estimated map data, causing the vehicle to decelerate, or causing a fleet of vehicles to refrain from traversing an area in the environment corresponding with the inconsistency.

I. The method as recited in any one of paragraphs E-H, wherein the error is associated with the localization system and the remedial action comprises one or more of: sending an indication of the error to a remote operator, causing the vehicle to decelerate, or causing the vehicle to follow a trajectory of another vehicle for a period of time.

J. The method as recited in any one of paragraphs E-I, wherein the error is associated with the sensor system and the remedial action comprises one or more of: causing a perception system of the vehicle to associate a lower confidence score with the sensor data, causing a sensor system of the vehicle to be recalibrated, or causing the vehicle to decelerate.

K. The method as recited in any one of paragraphs E-J, wherein the inconsistency between the estimated map data and the stored map data comprises an inconsistency between a detected location of a traffic control annotation represented in the estimated map data and an expected location of the traffic control annotation represented in the stored map data.

L. The method as recited in any one of paragraphs E-K, wherein traffic control annotation is one or more of: a road edge, a road surface marking, a traffic sign, or a traffic light.

M. The method as recited in any one of paragraphs E-L, wherein the sensor data includes one or more of: image data, lidar data, radar data, or time of flight data.

N. The method as recited in any one of paragraphs E-M, wherein the estimated map data is top-down scene data representing the environment from a top-down perspective.

O. The method as recited in any one of paragraphs E-N, further comprising determining that the error is associated with the stored map data based at least in part on an intensity associated with a road surface marking represented in the estimated map data, the intensity indicative of an age of the road surface marking.

P. One or more non-transitory computer-readable media storing instructions that, when executed by one or more processors, cause the one or more processors to perform operations comprising: receiving sensor data associated with an environment in which a vehicle is operating; generating estimated map data based at least in part on the sensor data; receiving stored map data based at least in part on the sensor data; determining an inconsistency between the estimated map data and the stored map data; determining whether the inconsistency is attributable to an error associated with the stored map data, the sensor data, or a localization system of the vehicle; and performing a remedial action based at least in part on determining that the error is associated with at least one of the stored map data, the sensor data, or the localization system.

Q. The one or more non-transitory computer-readable media as recited in paragraph P, wherein the inconsistency between the estimated map data and the stored map data is an inconsistency between a first portion of the estimated map data and a first corresponding portion of the stored map data, the inconsistency less than a threshold consistency, the operations further comprising: determining a consistency between a second portion of the estimated map data and a second corresponding portion of the stored map data, wherein the consistency meets or exceeds the threshold consistency; and based at least in part on the inconsistency and the consistency, determining that the error is associated with the stored map data.

R. The one or more non-transitory computer-readable media as recited in any one of paragraphs P-Q, the operations further comprising: determining that a realignment of the stored map data relative to the estimated map data would cause a consistency between the estimated map data and the stored map data to meet or exceed a threshold consistency; and determining that the error is associated with the localization system of the vehicle based at least in part on the realignment.

S. The one or more non-transitory computer-readable media as recited in any one of paragraphs P-R, wherein the error is associated with the localization system and the remedial action comprises one or more of: sending an indication of the error to a remote operator associated with the vehicle; causing the vehicle to decelerate; or causing the vehicle to follow a trajectory of another vehicle for a period of time.

T. The one or more non-transitory computer-readable media as recited in any one of paragraphs P-S, wherein the error is associated with the sensor data and the remedial action comprises one or more of: causing a perception system of the vehicle to associate a lower confidence score with the sensor data, causing a sensor system of the vehicle to be recalibrated, or causing the vehicle to decelerate.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results

What is claimed is:

1. A system comprising:
   one or more processors; and
   one or more non-transitory computer-readable media storing instructions that, when executed by the one or more processors, cause the system to perform operations comprising:
      receiving sensor data associated with an environment in which a vehicle is operating;
      generating, based at least in part on the sensor data, an estimated map indicating a detected location of a traffic control annotation relative to the vehicle, wherein the estimated map comprises a multi-channel image representing the environment surrounding the vehicle from a top-down perspective, and wherein individual channels of the multi-channel image represent different map features;
      receiving, based at least in part on the sensor data, a stored map indicating at least an expected location of the traffic control annotation relative to the vehicle;
      comparing the stored map with the estimated map, wherein the comparing comprises analyzing each of the individual channels of the multi-channel image and comparing to a per-channel threshold value;
      determining, based at least in part on the comparing, an inconsistency between the detected location of the traffic control annotation and the expected location of the traffic control annotation;
      determining, based at least in part on the inconsistency, that a source of the inconsistency is one of three possible sources, wherein at least one of:
         determining that a first source of the inconsistency is an error associated with the stored map is based at least in part on determining that a first map element in the estimated map aligns with a first map element in the stored map and that a second map element in the estimated map does not align with a second map element in the stored map,
         determining that a second source of the inconsistency is an error associated with a sensor system associated with the vehicle is based at least in part on determining that the first map element in the estimated map does not align with the first map element in the stored map and that the second map element in the estimated map does not align with the second map element in the stored map, and
         determining that a third source of the inconsistency is an error associated with a localization system associated with the vehicle is based at least in part on determining that the estimated map can be realigned with the stored map; and
      causing the vehicle to perform a remedial action based at least in part on determining that the source of the error is associated with at least one of the stored map, the sensor system, or the localization system.

2. The system of claim 1, wherein the error is associated with the stored map and determining that the source of the inconsistency is attributable to the error associated with the stored map comprises:
   determining, based at least in part on the comparing, a consistency between a first portion of the stored map and a first portion of the estimated map;

determining that the consistency does not meet or exceed a threshold; and determining an inability to align the estimated map and the stored map such that a resultant consistency meets or exceeds the threshold.

3. The system of claim 1, wherein the error is associated with the stored map and the remedial action comprises one or more of:
   sending an indication of the error to a remote operator,
   causing a second vehicle to be dispatched to the detected location to gather additional sensor data,
   causing the sensor data to be stored for generation of updated map data,
   causing the vehicle to prioritize estimated map data associated with the estimated map relative to stored map data associated with the stored map while traversing the environment,
   causing the vehicle to decelerate, or
   causing a fleet of vehicles to refrain from traversing an area in the environment corresponding with the inconsistency.

4. A method comprising:
   receiving sensor data associated with an environment in which a vehicle is operating;
   generating an estimated map based at least in part on the sensor data, wherein the estimated map comprises a multi-channel image representing the environment surrounding the vehicle from a top-down perspective, and wherein individual channels of the multi-channel image represent different map features;
   receiving a stored map based at least in part on the sensor data;
   comparing the stored map with the estimated map, wherein the comparing comprises analyzing each of the individual channels of the multi-channel image and comparing to a per-channel threshold value;
   determining, based at least in part on the comparing, an inconsistency between the estimated map and the stored map;
   determining that a source of the inconsistency is one of three possible sources, wherein at least one of:
      determining that a first source of the inconsistency is an error associated with the stored map is based at least in part on determining that a first map element in the estimated map aligns with a first map element in the stored map and that a second map element in the estimated map does not align with a second map element in the stored map,
      determining that a second source of the inconsistency is an error associated with a sensor system associated with the vehicle is based at least in part on determining that the first map element in the estimated map does not align with the first map element in the stored map and that the second map element in the estimated map does not align with the second map element in the stored map, and
      determining that a third source of the inconsistency is an error associated with a localization system associated with the vehicle is based at least in part on determining that the estimated map can be realigned with the stored map; and
   causing the vehicle to perform a remedial action based at least in part on determining that the error is associated with at least one of the stored map, the sensor system, or the localization system.

5. The method of claim 4, wherein the inconsistency between the estimated map and the stored map is an inconsistency between a first portion of the estimated map and a first corresponding portion of the stored map and is less than a threshold consistency, the method further comprising:
   determining that a consistency between a second portion of the estimated map and a second corresponding portion of the stored map meets or exceeds the threshold consistency; and
   based at least in part on the inconsistency and the consistency, determining that the error is associated with the stored map.

6. The method of claim 4, wherein the error is associated with the stored map and the remedial action comprises one or more of:
   sending an indication of the error to a remote operator,
   causing a second vehicle to be dispatched to generate new map data of the environment,
   causing the sensor data to be stored for generation of updated map data,
   causing the vehicle to prioritize estimated map data associated with the estimated map,
   causing the vehicle to decelerate, or
   causing a fleet of vehicles to refrain from traversing an area in the environment corresponding with the inconsistency.

7. The method of claim 4, wherein the error is associated with the localization system and the remedial action comprises one or more of:
   sending an indication of the error to a remote operator,
   causing the vehicle to decelerate, or
   causing the vehicle to follow a trajectory of another vehicle for a period of time.

8. The method of claim 4, wherein the error is associated with the sensor system and the remedial action comprises one or more of:
   causing a perception system of the vehicle to associate a lower confidence score with the sensor data,
   causing the sensor system of the vehicle to be recalibrated, or
   causing the vehicle to decelerate.

9. The method of claim 4, wherein the inconsistency between the estimated map and the stored map comprises an inconsistency between a detected location of a traffic control annotation represented in the estimated map and an expected location of the traffic control annotation represented in the stored map.

10. The method of claim 9, wherein the traffic control annotation is one or more of:
    a road edge,
    a road surface marking,
    a traffic sign, or
    a traffic light.

11. The method of claim 4, wherein the sensor data includes one or more of:
    image data,
    lidar data,
    radar data, or
    time of flight data.

12. The method of claim 4, further comprising determining that the error is associated with the stored map based at least in part on an intensity associated with a road surface marking represented in the estimated map, the intensity indicative of an age of the road surface marking.

13. One or more non-transitory computer-readable media storing instructions that, when executed by one or more processors, cause the one or more processors to perform operations comprising:

receiving sensor data associated with an environment in which a vehicle is operating;
generating an estimated map based at least in part on the sensor data, wherein the estimated map comprises a multi-channel image representing the environment surrounding the vehicle from a top-down perspective, and wherein individual channels of the multi-channel image represent different map features;
receiving a stored map based at least in part on the sensor data;
comparing the stored map with the estimated map, wherein the comparing comprises analyzing each of the individual channels of the multi-channel image and comparing to a per-channel threshold value;
determining, based at least in part on the comparing, an inconsistency between the estimated map and the stored map;
determining that a source of the inconsistency is one of three possible sources, wherein at least one of:
determining that a first source of the inconsistency is an error associated with the stored map is based at least in part on determining that a first map element in the estimated map aligns with a first map element in the stored map and that a second map element in the estimated map does not align with a second map element in the stored map,
determining that a second source of the inconsistency is an error associated with a sensor system associated with the vehicle is based at least in part on determining that the first map element in the estimated map does not align with the first map element in the stored map and that the second map element in the estimated map does not align with the second map element in the stored map, and
determining that a third source of the inconsistency is an error associated with a localization system associated with the vehicle is based at least in part on determining that the estimated map can be realigned with the stored map; and
causing the vehicle to perform a remedial action based at least in part on determining that the error is associated with at least one of the stored map, the sensor data, or the localization system.

14. The one or more non-transitory computer-readable media of claim 13, wherein the inconsistency between the estimated map and the stored map is an inconsistency between a first portion of the estimated map and a first corresponding portion of the stored map, the inconsistency less than a threshold consistency, the operations further comprising:
determining a consistency between a second portion of the estimated map and a second corresponding portion of the stored map, wherein the consistency meets or exceeds the threshold consistency; and
based at least in part on the inconsistency and the consistency, determining that the error is associated with the stored map.

15. The one or more non-transitory computer-readable media of claim 13, wherein the error is associated with the localization system and the remedial action comprises one or more of:
sending an indication of the error to a remote operator associated with the vehicle;
causing the vehicle to decelerate; or
causing the vehicle to follow a trajectory of another vehicle for a period of time.

16. The one or more non-transitory computer-readable media of claim 13, wherein the error is associated with the sensor data and the remedial action comprises one or more of:
causing a perception system of the vehicle to associate a lower confidence score with the sensor data,
causing the sensor system of the vehicle to be recalibrated, or
causing the vehicle to decelerate.

17. The method of claim 4, wherein determining the source of the inconsistency comprises:
attempting an alignment between the estimated map and the stored map; and
analyzing which features of the estimated map can be aligned with corresponding features of the stored map.

18. The system of claim 1, wherein comparing the stored map and the estimated map comprises utilizing an optical flow algorithm configured to evaluate segmentation consistency between the stored map and the estimated map.

19. The system of claim 1, wherein comparing the stored map and the estimated map comprises determining a difference between a dilated input associated with lane lines as indicated in the stored map and input associated with lane lines as indicated in the estimated map.

* * * * *